United States Patent
Recio et al.

[19]

[11] Patent Number: 6,035,418
[45] Date of Patent: *Mar. 7, 2000

[54] SYSTEM AND METHOD FOR IMPROVING RESOURCE UTILIZATION IN A TCP/IP CONNECTION MANAGEMENT SYSTEM

[75] Inventors: Renato John Recio; Wen-Tzer Thomas Chen, both of Austin, Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/767,242

[22] Filed: Dec. 13, 1996

[51] Int. Cl.$^7$ ...................................................... G06F 11/14
[52] U.S. Cl. ............................................... 714/18; 714/48
[58] Field of Search ........................ 395/182.13, 182.02, 395/183.15, 200.54, 200.33, 200.53, 185.03, 185.04, 185.01; 371/68.2; 714/18, 748, 749, 43

[56] References Cited

U.S. PATENT DOCUMENTS

| | | | |
|---|---|---|---|
| 4,580,265 | 4/1986 | Gooding et al. ................... | 395/185.03 |
| 5,095,444 | 3/1992 | Motles ................................. | 364/514 |
| 5,347,524 | 9/1994 | I'Anson et al. ...................... | 371/29.1 |
| 5,355,453 | 10/1994 | Row et al. ........................... | 395/200 |
| 5,416,842 | 5/1995 | Aziz ..................................... | 380/30 |
| 5,430,709 | 7/1995 | Galloway .............................. | 370/13 |
| 5,442,637 | 8/1995 | Nguyen ................................ | 371/5.5 |
| 5,491,820 | 2/1996 | Belove et al. ........................ | 395/600 |
| 5,511,076 | 4/1996 | Ramakrishnan et al. ........... | 370/94.2 |
| 5,577,172 | 11/1996 | Vatland et al. ...................... | 395/114 |
| 5,678,007 | 10/1997 | Hurvig ................................. | 395/200.12 |

OTHER PUBLICATIONS

Park et al., "Design of Run–Time Configuration Manager for a Multimedia Network Environment", IEEE Publication, pp. 9–14, Mar. 1996.

*Primary Examiner*—Robert W. Beausoliel, Jr.
*Assistant Examiner*—Scott T. Baderman
*Attorney, Agent, or Firm*—Sawyer & Associates; Richard A. Henkler

[57] ABSTRACT

The present invention is a method and system for improving resource utilization in a connection management system. The present invention alleviates the resource contention and resource under-utilization problems, and avoids the problem of contamination from the late arrival of delayed packets to a new connection which utilizes the same resources used in a preview connection. The method includes transferring data by using the connection resources from the server; determining if an error occurred during the transfer of data; if an error is not detected, returning the connection resources to the server; and if an error is detected, indicating the existence of the error with a status bit and waiting a predetermined period of time prior to returning the connection resources to the server.

16 Claims, 3 Drawing Sheets

SYSTEM AND METHOD FOR IMPROVING RESOURCE UTILIZATION IN A TCP/IP CONNECTION MANAGEMENT SYSTEM

TECHNICAL FIELD

The present invention is related to a system and method for improving resource utilization in a connection management system, more particularly, for reducing the number of connections in a waiting state.

BACKGROUND

Today's network servers, such as web servers, utilized for internet applications, can serve hundreds of requests every second. Each of the requests is typically associated with a Transmission Control Protocol (TCP) connection, which is active until the request is completed. A client typically establishes a connection to a server and issues a request. The server then processes the request, returns a response, and closes the connection. Unlike traditional network applications, such as telnet or ftp, the web requests are usually active only for a short period of time, e.g., for acquiring a HyperText Markup Language (HTML) home page. Therefore, a Transmission Control Protocol/Internet Protocol (TCP/IP) connection in a web server environment will be active only for a very short period of time in most cases, typically on the order of microseconds.

When a server closes a TCP connection, it is required to keep information about that connection for a period of time, typically four minutes, in case a delayed packet is found and sabotages a new incarnation of the connection. The server will leave some resources typically allocated for every single connection closed in the past four minutes. On a busy server, this can become a serious resource problem—hundreds of thousands of control blocks may need to be set aside until a four-minute TIME_WAIT expires, which can cause not only resource under-utilization but also the contention for the limited resources. Accordingly, what is needed is an improved method and system for utilizing these resources. The present invention addresses such a need.

SUMMARY

The present invention is a method and system for improving resource utilization in a connection management system. The present invention alleviates the resource contention and resource under-utilization problems, and avoids the problem of contamination from the late arrival of delayed packets to a new connection which utilizes the same resources used in a previous connection.

A method according to the present invention is for utilizing resources for connection management for data transfers in a network environment, the network environment including a server, the server including connection resources, the method comprising transferring data by using the connection resources from the server; determining if an error occurred during the transfer of data; if an error is not detected, returning the connection resources to the server; and if an error is detected, waiting a predetermined period of time prior to returning the connection resources to the server.

The present invention alleviates these problems by keeping track of the state of each TCP connection. In the case where no re-transmission is needed, i.e., no packet lost during the time the connection is active, all the resources associated with the connection will be returned immediately to the system when the connection is closed. In the case when a retransmission is required, the system will still keep the information about closed connections with re-transmissions for a predetermined time such as four minutes. In this way, the system resources can be freed in time for other usages.

DETAILED DESCRIPTION

The present invention relates to a system and method for improving resource utilization in a connection management system in a network environment. The following description is presented to enable one of ordinary skill in the art to make and use the illustrative embodiment and is provided in the context of a patent application and its requirements. Various modifications to the illustrative embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
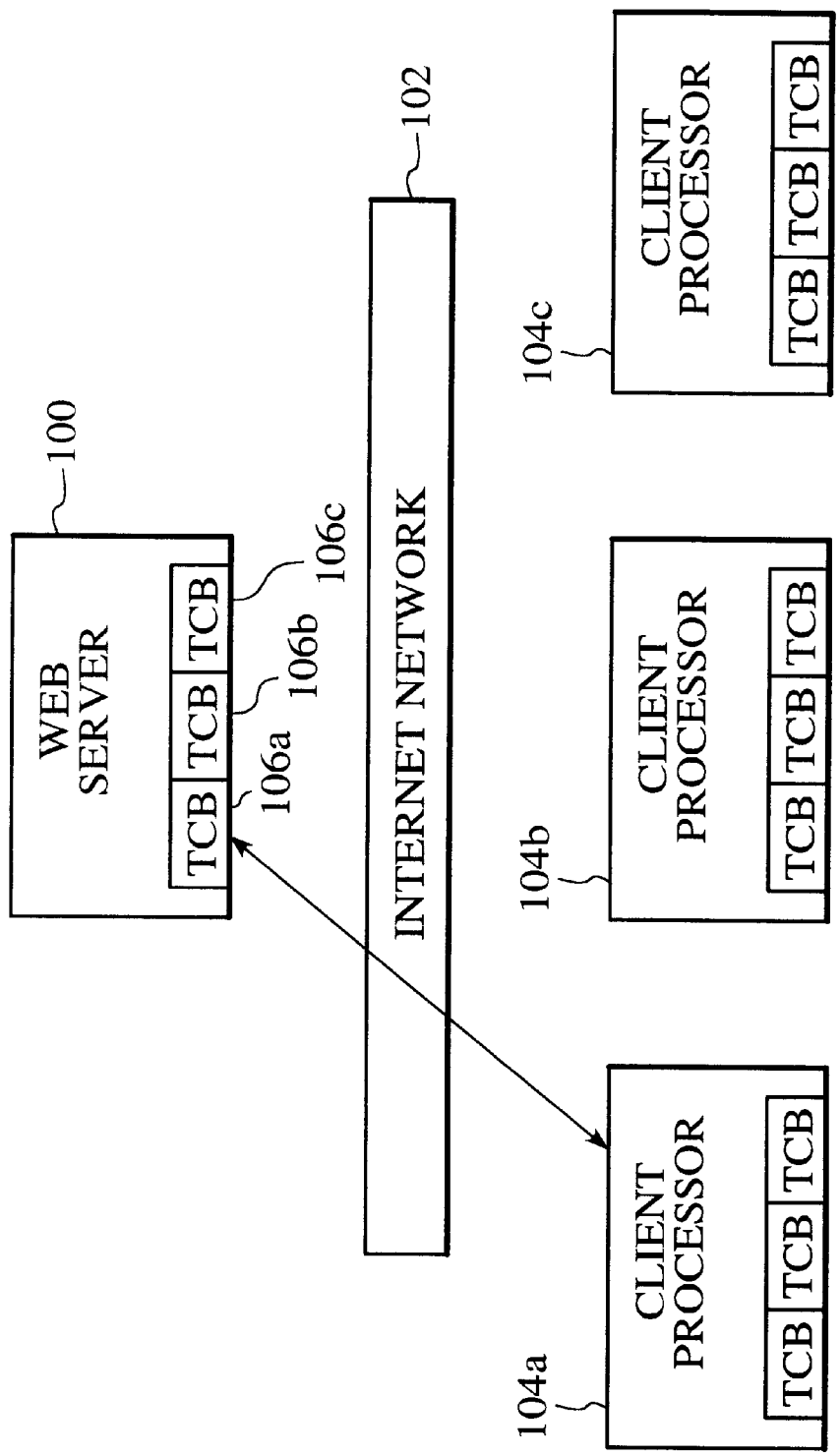
FIG. 1 is a block diagram of a system in which the present invention resides.

FIG. 1 is a block diagram of a system in which the present invention resides. The system includes a web server 100, an internet network 102, and client processors 104a–104c. When a client processor 104 requires information from the web server 100, the client processor 104 establishes a connection to the server 100, and issues a request. The web server 100 then processes the request, returns a response, and closes the connection. These connections are established via transmission control blocks (TCB) 106a–106c.

Figure 2:
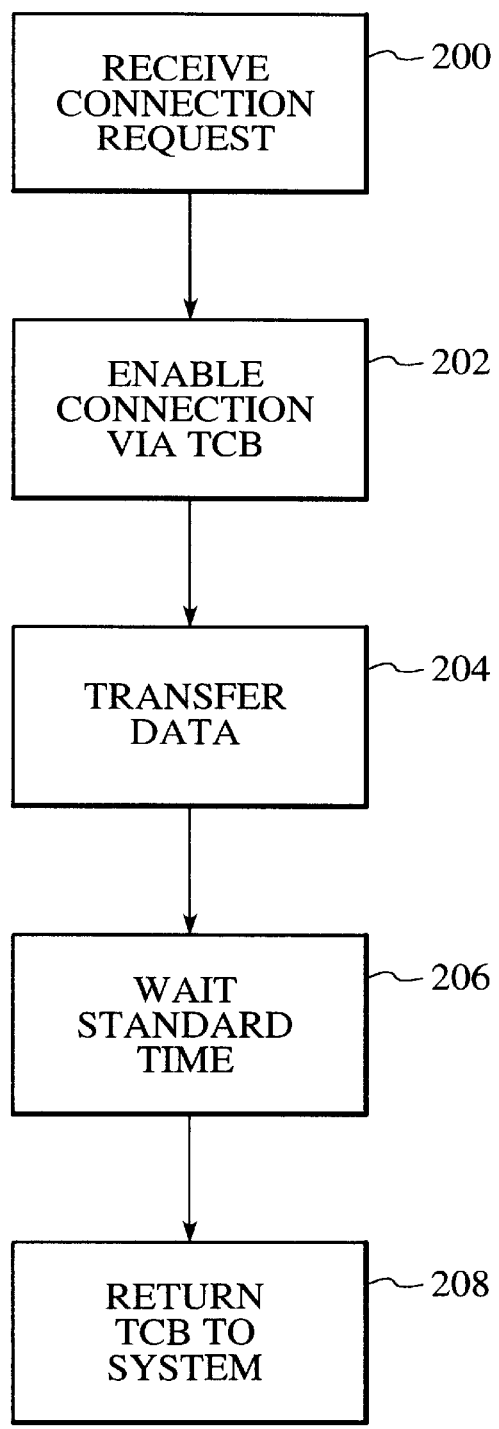
FIG. 2 is a flow diagram of a conventional method for enabling and disabling connections for transferring data.

FIG. 2 is a flow diagram of a conventional method for enabling and disabling connections for data transfers. The web server typically receives a connection request via step 200 and enables a connection through a TCB via step 202. The data is then transferred via step 204. The server then typically maintains information regarding the connection for a standard period of time via step 206. In the case of TCP/IP, the recommended period of time for waiting (TIME_WAIT) is four minutes. Once the TIME_WAIT has elapsed, then the TCB is returned to the web server system via step 208. The fundamental problem with this conventional method is that the connections need to remain available for what is relatively a very long period of time. This problem is compounded by the web server typically requiring multiple connections for every request.

Since the TCP protocol demands that the information about a closed connection needs to be kept until the TIME_WAIT expires, it is likely the utilization of the resources associated with a TCP connection is very low. Also, a web server will have to keep hundreds of thousands of control blocks for the closed TCP connections at almost any instant of time when the server is busy. This will not only cause the resource under-utilization but also introduce serious contention at the system level for the limited resources.

One of the mechanisms to solve this problem is to disable or use a smaller TIME_WAIT value in the TCP implementation. But, this will violate the standard. Also, this can introduce a higher possibility of having a delayed packet arrive late to contaminate a new connection which utilizes the same resources used in a previous connection.

The present invention improves resource utilization by reducing the number of connections in the TIME_WAIT state. The present invention alleviates the resource contention and resource under-utilization problems, and avoids the problem of contamination from the late arrival of delayed packets in a new connection which utilizes the same resources used in a previous connection.

According to the present invention, at connection set up time, a STATUS flag associated with the connection is set or reset. Once the connection is established, data exchange commences. Whenever a retransmission such as those due to a loss of a packet or transmission time out, is detected for the connection, the STATUS flag for the connection is preferably set to one. The STATUS flag can reside in the Transmission Control Block (TCB) or any data structure associated with the connection.

At the time an opened connection is closed, the system checks the STATUS flag for the connection. The resources associated with the connection, such as TCBs, will be released immediately if its STATUS flag has not been changed to one. In this case, all the resources associated with the closed connection can be reassigned immediately if needed. Alternatively, if the STATUS flag has been set to one, the TCB for the connection with packet retransmission is linked to the TIME_WAIT queue. It is preferable that the TIME_WAIT period lasts the recommended amount, which is currently four minutes. When TIME_WAIT expires, the resources associated with the connection can then be released.

With addition of a single-bit STATUS flag and simple logics of recording re-transmission in exchanging data and checking the STATUS flag at closing connection, the resources associated with most of the connections can be released for reassignment at the time connection is closed. The connections with retransmission, which have potential to receive a delayed packet, will preferably wait until the TIME_WAIT expires, as is done in the current TCP implementations, to avoid any possible contamination from late arrival of delayed packets.

Figure 3:
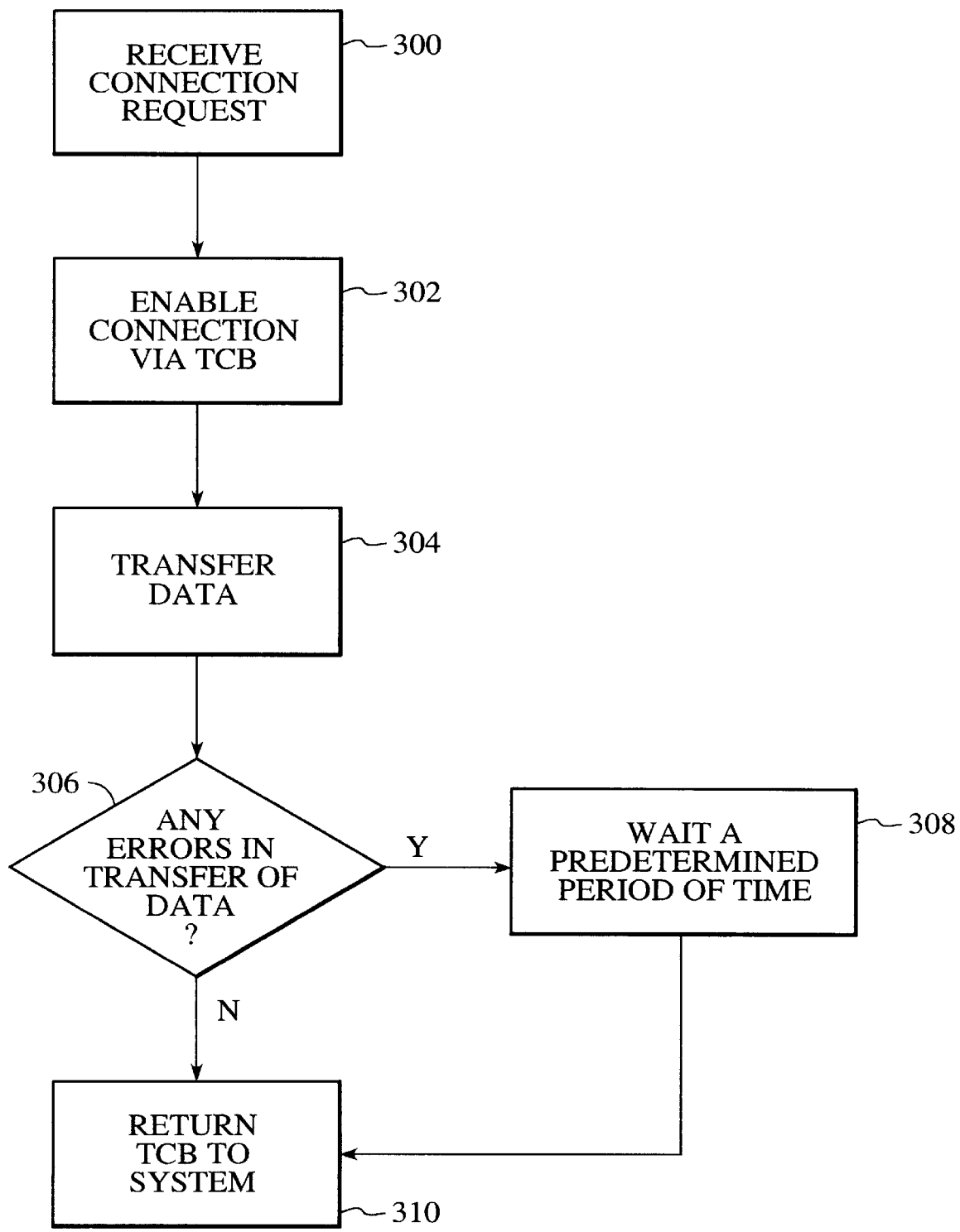
FIG. 3 is a flow diagram of a method according to the present invention.

FIG. 3 is a flow diagram of a method according to the present invention. A connection request is received by the web server via step 300. A connection is enabled by using a TCB via step 302. Then, data is transferred via step 304. It is then determined if any errors have occurred during the transfer of the data via step 306. If there has been an error in the transfer of the data, then a predetermined amount of time is allowed to elapse via step 308. The predetermined period of time is preferably the recommended amount of TIME_WAIT, which is currently four minutes. Once the predetermined period of time has elapsed, then the TCB is returned to the system and the resources can be applied to other connections. If, however, no errors were detected in the transfer of the data via step 306, then the TCB is returned to the system without having to wait the established TIME_WAIT period. The indication of whether there are any errors found in the transfer of the data via step 306 is preferably indicated by using a status bit that indicates if there have been any errors.

Although the system and method has been described in accordance with the embodiments shown, one of ordinary skill in the art will readily recognize that there could be variations to the embodiments and those variations would be within the spirit and scope of the above-described system and method. Accordingly, many modifications may be made by one of ordinary skill in the art without departing from the spirit and scope of the appended claims.

What is claimed is:

1. A method for utilizing resources for connection management for data transfers in a network environment, the network environment including a server, the server including connection resources, the method comprising sequentially the steps of:

a) transferring data by using the connection resources from the server;

b) determining if an error occurred during the transfer of data;

c) if an error is not detected, immediately returning the connection resources to the server; and d) if an error is detected, indicating the existence of the error with a status bit, and waiting a predetermined period of time prior to returning the connection resources to the server.

2. The method of claim 1, wherein the connection resources include a transmission control block (TCB).

3. The method of claim 1, wherein the server is an internet server.

4. The method of claim 1, wherein the predetermined period of time is a wait time recommended as an industry standard.

5. The method of claim 1, wherein the predetermined period of time is approximately four minutes.

6. A system for utilizing resources for connection management of data transfers in a network environment, the system comprising:

a server having a connection resources for transferring data, the connection resources being allocated for the data transfer, wherein before the connection resources are returned to the server, detecting whether an error occurred during the data transfer, wherein the connection resources are immediately returned to the server if no error is detected in the data transfer, otherwise, wherein if an occurrence of an error is detected, a status bit indicates the existence of an error, and a predetermined period of time is allowed to elapse prior to returning the connection resources to the server; and a processor coupled to the server for communicating with the server.

7. The system of claim 6, wherein the server is an internet server.

8. The system of claim 6, wherein the connection resources include a transmission control block (TCB).

9. A system for utilizing resources for connection management for data transfers in a network environment, the system comprising:

server means for communicating with processors, the server means having connection resources for transferring data, the connection resources being allocated for the data transfer, wherein before the connection resources are returned to the server, detecting whether an error occurred during the data transfer, wherein the connection resources are immediately returned to the server means if no error is detected in the data transfer, otherwise, wherein if an occurrence of an error transfer is detected, a status bit indicates the existence of an error, and a predetermined period of time is allowed to elapse prior to returning the connection resources to the server means; and a processing means coupled to the server means for communicating with the server means.

10. A computer readable medium containing program instructions for utilizing resources in connection management for data transfers in a network environment including a server, the program instructions for:

a) transferring data by using the connection resources from the server;

b) determining if an error occurred during the transfer of data;

c) if an error is not detected, immediately returning the connection resources to the server; and d) if an error is detected, indicating the existence of the error with a status bit, and waiting a predetermined period of time prior to returning the connection resources to the server.

11. A method for utilizing resources for connection management for data transfers in a network environment, the network environment including a server, the server including connection resources, the method comprising:

a) transferring data by using the connection resources from the server;

b) before returning the connection resources to the server, detecting whether or not an error occurred during the transfer of data;

c) if an error is not detected, indicating the non-occurrence of the error with a status bit, and immediately returning the connection resources to the server; and d) if an error is detected, indicating the occurrence of the error with a status bit, and waiting a predetermined period of time prior to returning the connection resources to the server.

12. A system for utilizing resources for connection management of data transfers in a network environment, the system comprising:

a server having a connection resources for transferring data, the connection resources being allocated for the data transfer, wherein before the connection resources are returned to the server, detecting whether or not an error occurred during the data transfer, wherein if an occurrence of an error is not detected, a status bit indicates the non-occurrence, and the connection resources are immediately returned to the server, wherein if an occurrence of an error is detected, the status bit indicates the occurrence of the error, and a predetermined period of time is allowed to elapse prior to returning the connection resources to the server; and a processor coupled to the server for communicating with the server.

13. A system for utilizing resources for connection management for data transfers in a network environment, the system comprising:

server means for communicating with processors, the server means having connection resources for transferring data, the connection resources being allocated for the data transfer, wherein before the connection resources are returned to the server, detecting whether or not an error occurred during the data transfer, wherein if an occurrence of an error is not detected, a status bit indicates the non-occurrence, and the connection resources are immediately returned to the server means, wherein if an occurrence of an error transfer is detected, the status bit indicates the occurrence of the error, and a predetermined period of time is allowed to elapse prior to returning the connection resources to the server means; and a processing means coupled to the server means for communicating with the server means.

14. A computer readable medium containing program instructions for utilizing resources in connection management for data transfers in a network environment including a server, the program instructions for:

a) transferring data by using the connection resources from the server;

b) before returning the connection resources to the server, detecting whether or not an error occurred during the transfer of data;

c) if an error is not detected, indicating the non-occurrence of the error with a status bit, and immediately returning the connection resources to the server; and d) if an error is detected, indicating the occurrence of the error with a status bit, and waiting a predetermined period of time prior to returning the connection resources to the server.

15. A method for utilizing resources for connection management for data transfers in a network environment, the network environment including a server, the server including connection resources, the method comprising the steps of:

a) transferring data by using the connection resources from the server;

b) creating an error bit for indicating a retransmission due to any errors which occurred during the transferring of the data;

c) returning the connection resources to the server according to a predetermined time period based upon the indication of the error bit; and d) returning, in response to not detecting an error via the error bit, the connection resources immediately to the server.

16. The method of claim 15, wherein the error bit indicates an error, and step c) further comprises the steps of:

waiting, in response to detecting an error via the error bit, a predetermined time period to return the connection resources to the server.

* * * * *